United States Patent [19]
Strickland

[11] Patent Number: 5,952,971
[45] Date of Patent: Sep. 14, 1999

[54] POLARIMETRIC DUAL BAND RADIATING ELEMENT FOR SYNTHETIC APERTURE RADAR

[75] Inventor: Peter C. Strickland, Ottawa, Canada

[73] Assignee: EMS Technologies Canada, Ltd., Ottawa, Canada

[21] Appl. No.: 08/807,628

[22] Filed: Feb. 27, 1997

[51] Int. Cl.[6] .................................................. H01Q 1/38
[52] U.S. Cl. .................................. 343/700 MS; 343/725; 343/741
[58] Field of Search ........................... 343/725, 700 MS, 343/741, 866, 727, 728, 769

[56] References Cited

U.S. PATENT DOCUMENTS

| | | | |
|---|---|---|---|
| 5,087,920 | 2/1992 | Tsurumaru et al. | 343/700 MS |
| 5,300,936 | 4/1994 | Izadian | 343/741 |
| 5,502,453 | 3/1996 | Tsukamoto et al. | 343/700 MS |
| 5,554,995 | 9/1996 | Jun | 343/700 MS |
| 5,633,645 | 5/1997 | Day | 343/700 MS |
| 5,668,558 | 9/1997 | Hong | 343/700 MS |

*Primary Examiner*—Don Wong
*Assistant Examiner*—Tan Ho
*Attorney, Agent, or Firm*—Pascal & Associates

[57] ABSTRACT

A dual band, dual polarized antenna comprising an array of resonators in a plane for radiating at a first frequency, a ring resonator in a plane, the array of resonators being contained within a projection of the boundary of the ring resonator, the ring resonator for radiating at a second frequency which is lower than the first frequency, apparatus for exciting the array of resonators to cause them to radiate at the first frequency with dual polarizations simultaneously, and apparatus for exciting the ring resonator to cause it to radiate at the second frequency with dual polarizations simultaneously.

19 Claims, 5 Drawing Sheets

POLARIMETRIC DUAL BAND RADIATING ELEMENT FOR SYNTHETIC APERTURE RADAR

FIELD OF THE INVENTION

This invention relates to the field of antennas, and in particular to an improved dual frequency antenna which radiates at each of two frequencies simultaneously with two polarizations.

BACKGROUND TO THE INVENTION

Phased array antennas, such as those used in spaceborne synthetic aperture radar, often require two operating frequencies sharing a common aperture. Such antennas may in some cases excite electromagnetic emission in multiple modes using a single resonator. These structures generally do not provide dual polarization and are often too large for use as elements in phased arrays without introducing grating lobes.

Some antennas have however used more than a single resonator, each emitting at a single frequency.

Kerr et al, in U.S. Pat. No. 4,060,810, issued Nov. 29, 1977 describes a metal patch antenna operating in the L-band, which surrounds a higher frequency X-band microstrip patch antenna. However this antenna does not provide an electronically steerable array. The antenna elements can only emit using a single polarization each. In addition, the antenna is larger than desirable.

Izadian, in U.S. Pat. No. 5,300,936 issued Apr. 5, 1994 describes a loop radiator surrounding planar patch radiators, the radiators emitting at L-band and S-band. The planar radiators emit using (single) circular polarization. The loop radiator can only emit using a single polarization.

However this antenna also does not provide an electronically steerable array. No means is described to cause the antenna elements to be able to emit plural frequencies, each at two polarizations. In addition, the antenna is larger than desirable.

Patin etal, in U.S. Pat. No. 5,001,493 describes arrays of square patch antennas each surrounded by a square annular antenna. The antenna operates at different frequencies. However no means is described to cause the antenna elements to be able to emit plural frequencies, each at dual polarizations.

Braun et al, in U.S. Pat. No. 5,160,936, issued Nov. 3, 1992, teaches an array of S-band cells surrounded by a ground plane. A slot in each array radiates in the UHF band. However no means is described to cause the antenna elements to be able to emit plural frequencies, each at two polarizations.

Lefeuvre et al, in U.S. Pat. No. 5,233,364, issued Aug. 3, 1993, teaches that dual polarized antenna elements of the same or different types may be contained in an array. However, the structure of the described antenna is complex, and due to its structural form the elements can be easily misspaced during a rough spacecraft launch and it is thus not ideally suitable for space applications. In addition the antenna is larger than is desirable.

SUMMARY OF THE INVENTION

The present invention provides an antenna that can be usefully employed in satellite based synthetic aperture radar, which allows the antenna aperture to be shared between multiple frequency bands and multiple polarization channels. The individual radiating elements operate simultaneously at two or more frequencies, and with two separate polarization channels at each of these frequencies. The polarization purity has been determined to be extremely good, in order to discriminate the cross-polarized field component, which is on average comparatively weak. The radiating elements are also quite small, and thus can be closely spaced in the aperture, in order to produce low sidelobes and low grating lobes in the radiation patterns.

In the laboratory prototype, cross-polarization levels below ±25 dB have been achieved over large angular range.

A laboratory prototype of the antenna has also achieved an impedance bandwidth in excess of 50 MHz, and thus allows high resolution imaging. Its weight is minimized, in order to accommodate large antenna arrays as required in spaceborn synthetic aperture radar systems.

The present invention is thus more suitable for spaceborn applications such as synthetic aperture radar than those described above. Further, it can be used for example for airborn synthetic aperture radar, electronic warfare systems and focal plane feeds for reflector antennas.

The present invention utilizes a compact ring resonator operating at a lower frequency such as at L-band, surrounding an array of resonators which operate at a higher frequency such as at C-band. Each of the resonators is driven so as to emit at two polarizations, preferably by exciting each resonator at four opposite feed points with phases of 0° and 180° for each polarization. Preferably the excitations are balanced.

In accordance with a further embodiment, the ring resonator is rectangular, preferably square, each side thereof having a length no greater than ¼ wavelength at the frequency at which it is to emit. With the array of resonators each being square, the result is a very compact dual band structure with each resonator capable of simultaneous dual polarizations.

In accordance with an embodiment of the invention, a dual band, dual polarized antenna is comprised of an array of resonators in a plane for radiating at a first frequency, a ring resonator in a plane, the array of resonators being contained within a projection of the boundary of the ring resonator, the ring resonator for radiating at a second frequency which is lower than the first frequency, apparatus for exciting the array of resonators to cause them to radiate at the first frequency with dual polarizations simultaneously, and apparatus for exciting the ring resonator to cause it to radiate at the second frequency with dual polarizations simultaneously.

In accordance with another embodiment, a dual band, dual polarized antenna is comprised of an array of resonators for radiating at a first frequency, a ring resonator which is parallel to a square surrounding the array of resonators for radiating at a second frequency which is lower than the first frequency, apparatus for applying signals to the array of resonators to cause them to radiate at the first frequency with dual polarizations simultaneously, apparatus for applying signals to the ring resonator to cause it to radiate at the second frequency with dual polarizations simultaneously, and a groundplane spaced from the array of resonators and the ring resonator by a dielectric.

BRIEF INTRODUCTION TO THE DRAWINGS

A better understanding of the invention will be obtained by considering the detailed description below, with reference to the following drawings, in which:

FIGS. 1A and 1B are plan and crossectional views of the basic structure of one form of antenna in accordance with an embodiment of the invention, FIGS. 2A, 2B and 2c are crossectional views of three feed embodiments of the invention, FIGS. 3A and 3B are isometric views of parts of the two additional embodiments, FIGS. 4 and 5 are graphs of radiation patterns taken in the lower and upper frequency bands respectively from a laboratory prototype of an embodiment of the invention shown in FIG. 3A, and FIGS. 6 and 7 are graphs of the return loss of the embodiment of the antenna shown in FIG. 3A.

DETAILED DESCRIPTION OF THE INVENTION

Figure 1A:
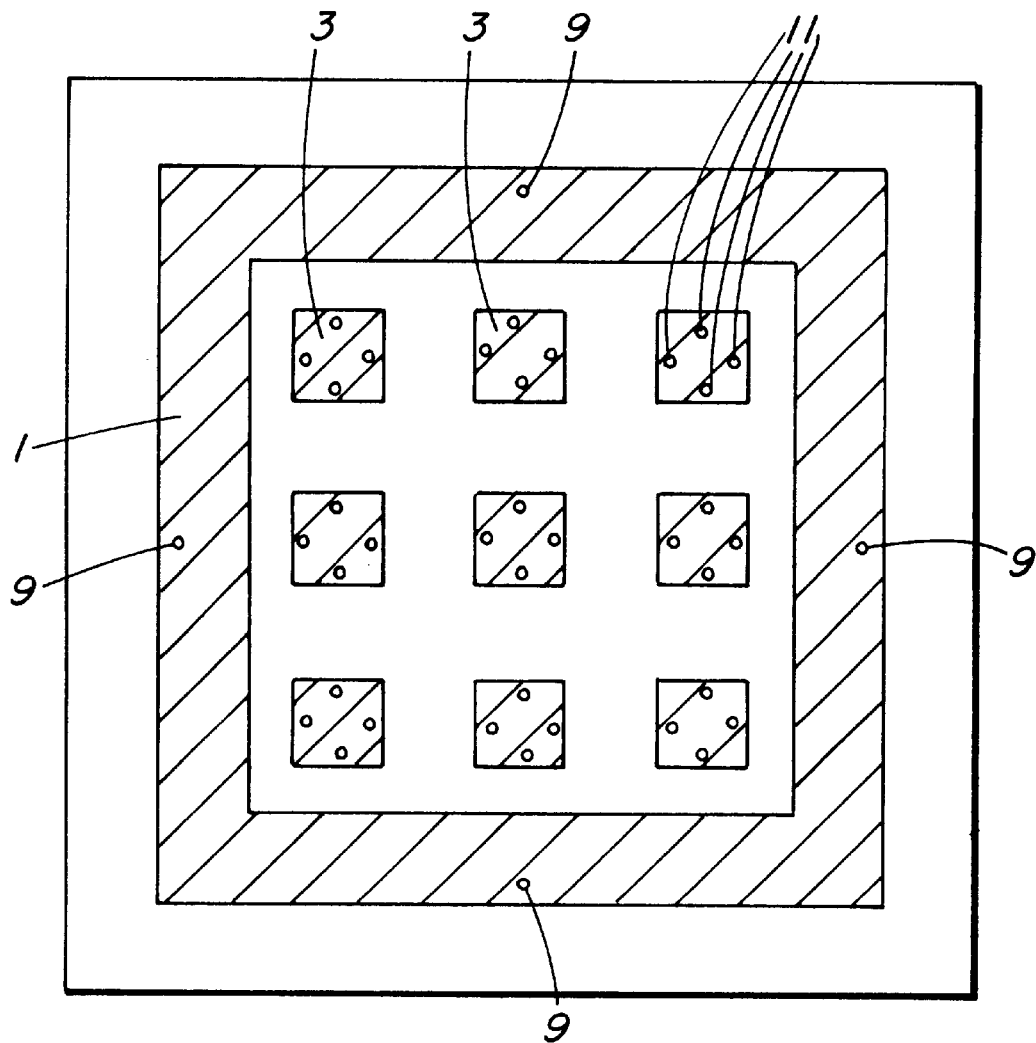
Figure 1B:
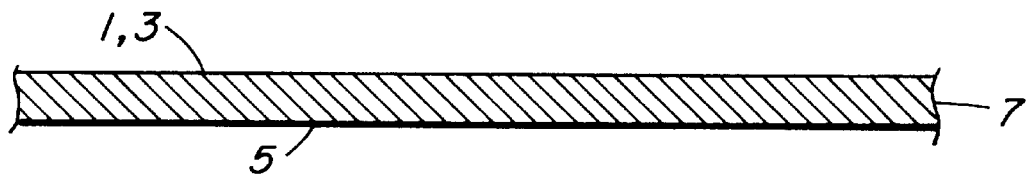

With reference to FIGS. 1A and 1B, a ring radiating (resonator) element 1 surrounds an array of square radiating resonators 3, separated from a ground plane 5 by a dielectric 7.

The ring resonator provides simultaneously dual polarized radiation at the lower operating frequency of the dual band structure. The circumference of the ring resonator is preferably approximately one guided wavelength. Thus the length of the square ring resonator is only one quarter of an electrical wavelength. This structure is much more compact than alternative implementations such as square microstrip patches, which would be approximately one half an electrical wavelength in width.

The square ring is excited at four feed points 9, with phases of 0° and 180° for each polarization. That is, signals for one polarization excite two opposing ends of the ring. Signals for the other polarization excite the other opposing ends of the ring. Two balanced feeds should be used for each polarization, which will result in suppression of the radiation from the feed probes over much of space and reduced cross-polarized radiation. The feed points are centered between each side of the ring.

Multiple solid square resonators 3 provide simultaneous dual polarized radiation at the higher operating frequency of the dual band structure. The length of each solid resonator should be approximately one-half of an electrical wavelength at the higher resonant frequency. In accordance with one embodiment, to be described in more detail below, each of the solid resonators is be fed at two points 11 for each polarization. Opposing sides are excited at 0° and 180° of electrical phase respectively, balanced, i.e. with equal magnitudes and 180° relative phase.

Preferably the radiating elements (resonators) is a metallization layer on printed circuit board, in the form of copper tracks which are defined using standard printed circuit photolithographic fabrication techniques. The circuit board may be FR-4, Kevlar™ or other dielectric material, with a copper film bonded or electrodeposited onto one surface, and preferably is very thin (e.g. 0.001–0.020 inches thick).

The printed circuit board is suspended above a conducting sheet 5 by means of layer of dielectric foam or honeycomb or other material 7. The dielectric maintains a constant spacing between the resonators and conducting sheet. The dielectric may be bonded to the circuit board and conducting sheet using an adhesive, bonding tape, or a bonding film, for example. It is preferred that the dielectric should have low permittivity in order to maximize the bandwidth of the antenna.

The conducting sheet forming a ground plane may be copper, aluminum or a circuit board comprised of a copper film bonded or electrodeposited onto a dielectric sheet.

In a successful laboratory prototype, the outside dimensions of the ring resonator 1 was 18.1 cm. on each side. The width of the metallization of the ring resonator was 2 cm. An array of 3×3 (9) solid squares was disposed within the ring resonator, each 2.4 cm. to a side. The outside of the array was separated from the inner edge of the metallization of the ring resonator by 1 cm, and the solid squares were mutually separated by 2.45 cm.

Figure 2A:
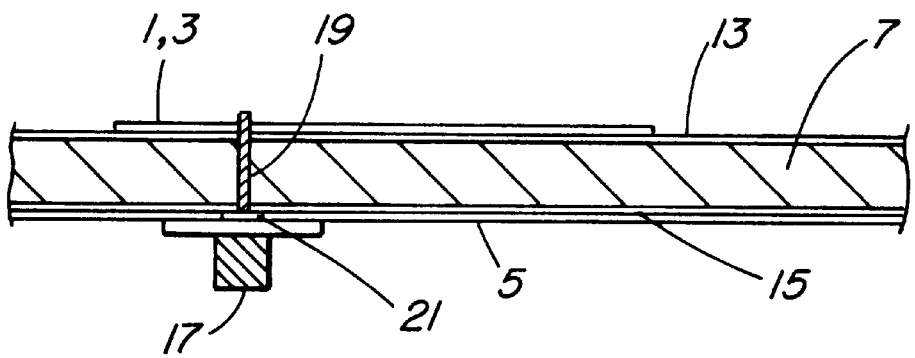

FIG. 2A illustrates an embodiment of a feed structure for a resonator. The resonators 1, 3 are disposed on an upper circuit board (dielectric) 13. The ground plane metallization 5 is disposed on a lower circuit board (dielectric) 15. The dielectric separator 7 spaces the upper and lower circuit board dielectrics 13 and 15, which defines the separation between the resonators 1, 3 metallization and the ground plane metallization 5.

A coaxial connector 17 is attached, e.g. by soldering its outside ground (shield) conductor to ground plane metallization 5. A center conductor 19 of the connector passes through a hole 21 in the ground plane metallization 5, through the dielectric 7, through a hole in circuit board dielectric 13, and is soldered to the resonator metallization where it is to be fed.

Figure 2B:
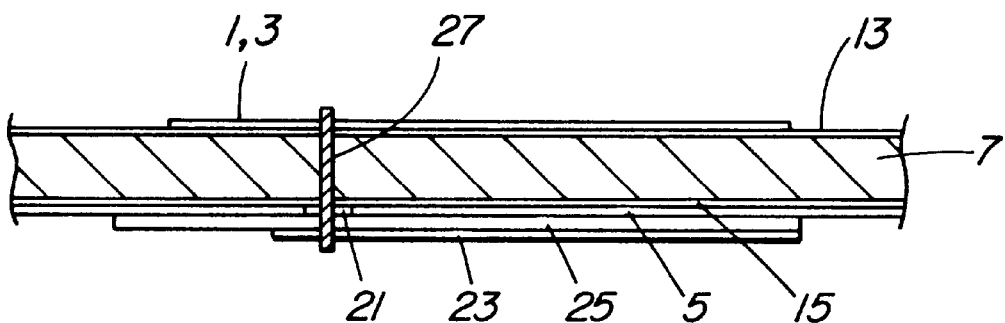

FIG. 2B illustrates an embodiment in which instead of a coaxial connector, a stripline or microstrip line 23 runs parallel to the ground plane metallization 5, separated therefrom by a dielectric substrate 25. A conducting pin 27 joins the stripline or microstrip line 23 to a resonator 1, 3. e.g. by soldering, passing through a hole 21 in the ground plane metallization 5.

Figure 2C:
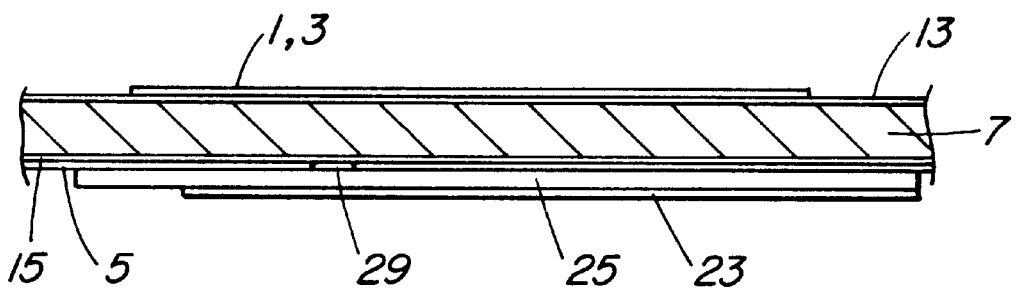

FIG. 2C illustrates an embodiment in which a stripline or microstrip line 25, instead of feeding a resonator by means of a pin as described with reference to FIG. 2B, radiates through an aperture 29 in the ground plane metallization, exciting fields in the aperture which then radiate into the dielectric 7 and excite currents in the resonator metallization 1, 3.

Figure 3A:
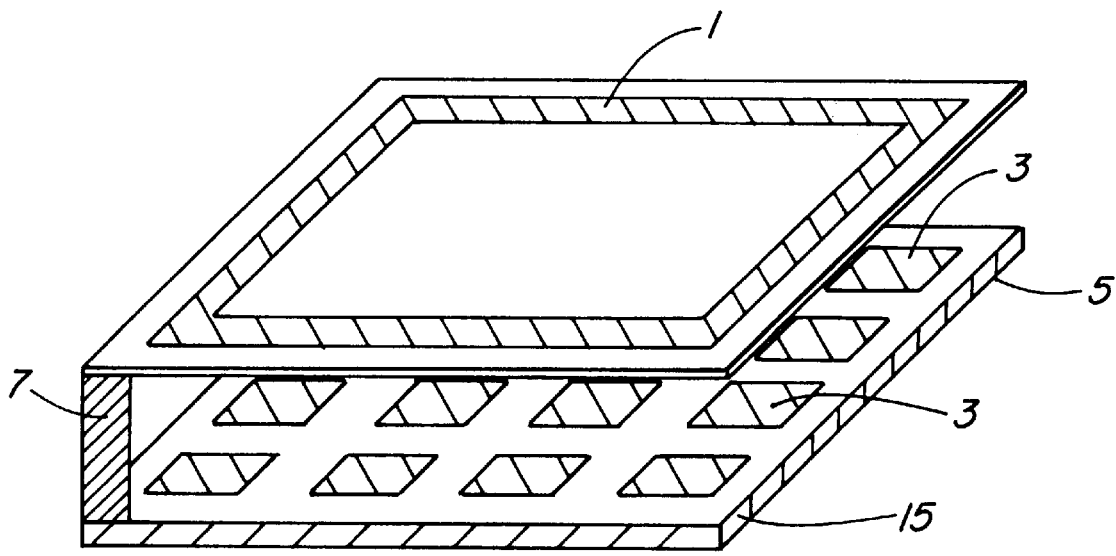

FIG. 3A illustrates another embodiment of the invention. In this embodiment, the ring resonator 1 is located on a printed circuit board which is on a different plane than the solid resonators 3. The solid resonators should be located laterally similarly to the structure shown in FIG. 1, in order to have their central orthogonal axes coincident, and thus have substantially the same aperture as the ring resonator. The ground plane conductive sheet for the antenna should be spaced from the lower resonators 3 on the side opposite the ring resonator.

The space between the spaced upper and lower printed circuit boards is filled with dielectric 7, although only a small section of dielectric is illustrated in order more clearly illustrate the structure. The support dielectric for the lower solid square resonators can be solid, foam or honeycomb.

Feed pins for the ring resonator in the upper layer can pass through holes in the lower circuit board. This construction is useful since the ring resonator operates at a lower frequency than the square resonators and thus requires a larger spacing above the conducting sheet in order to achieve a given bandwidth.

Figure 3B:
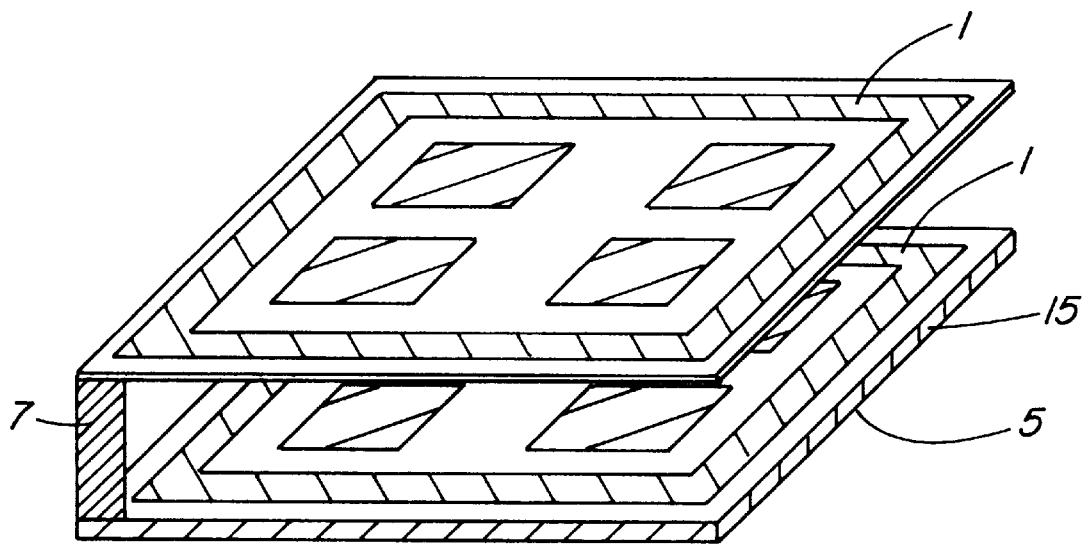

FIG. 3B illustrates a structure comprised of two layers, each of which has both ring and square resonators. The upper circuit board may have ring and/or square resonators. The ground plane is located only below the lower layer. In this case, the resonators on the upper circuit board are coupled electromagnetically to the resonators on the lower circuit board, and thus do not require additional feed pins or additional apertures in the conducting sheet.

It should be noted that while structures have been described in which the ring resonator surrounds the square resonators, the ring resonator can have dimensions which are smaller than the array size of the square resonators. In such case it is desirable to have a central orthogonal axis of the plane of the array of square resonators to be coincident with the central orthogonal axis of the ring resonator, in order to have coincident emission/reception apertures.

Thus for example, in a successful laboratory prototype of the embodiment of FIG. 3A, an array of eight solid radiators was used, 4×4, each resonator having a length of 2.4 cm. The ring resonator had an outside side length of 8.1 cm. and an inside side length of 6.9 cm. The solid resonators were suspended above the conducting sheet by an aramid fiber honeycomb layer of 0.32 cm thickness. The ring resonator was separated from the solid resonators by a honeycomb dielectric of 2 cm.

Figure 4:
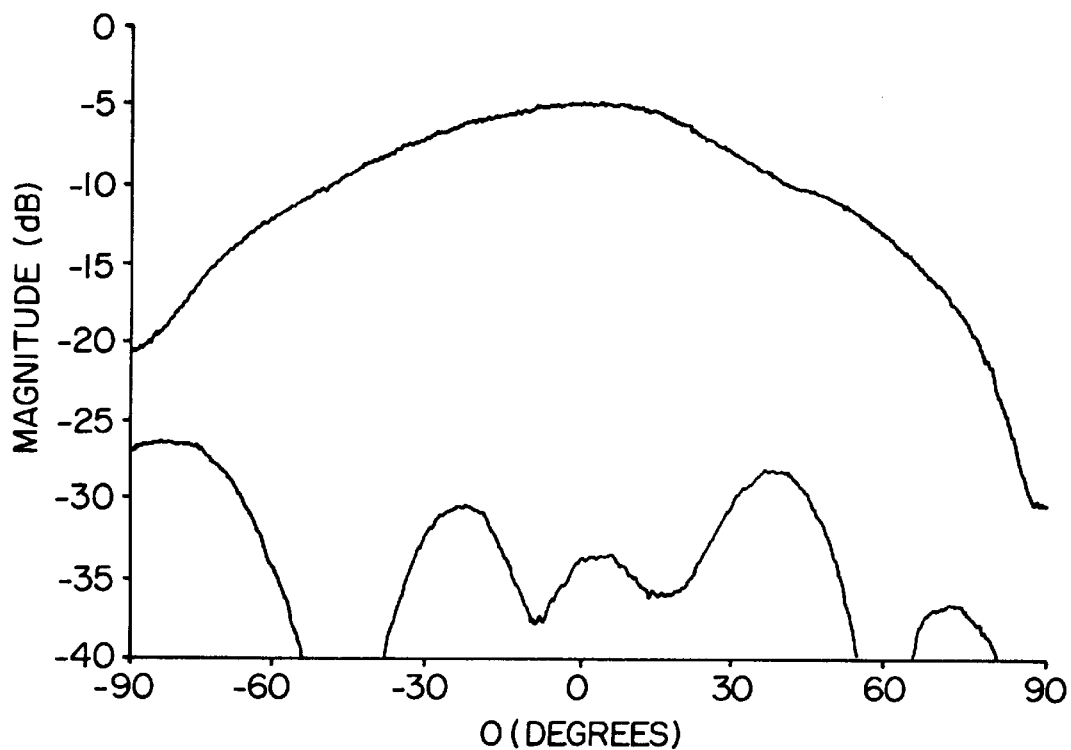
Figure 5:
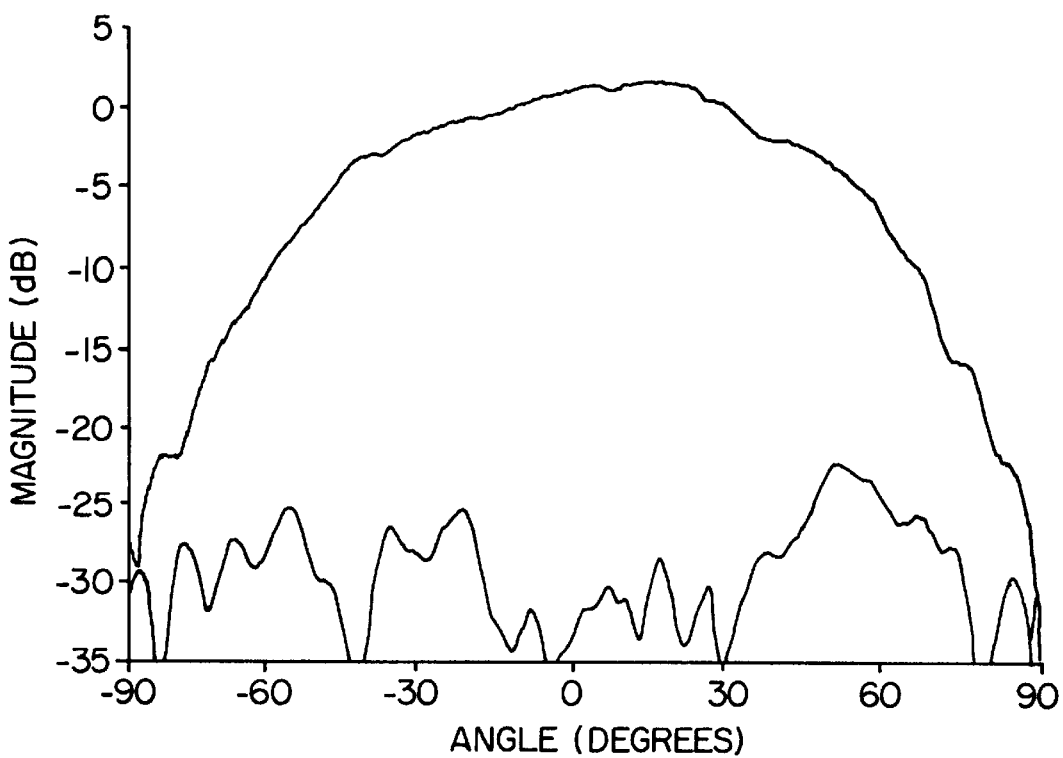
Figure 6:
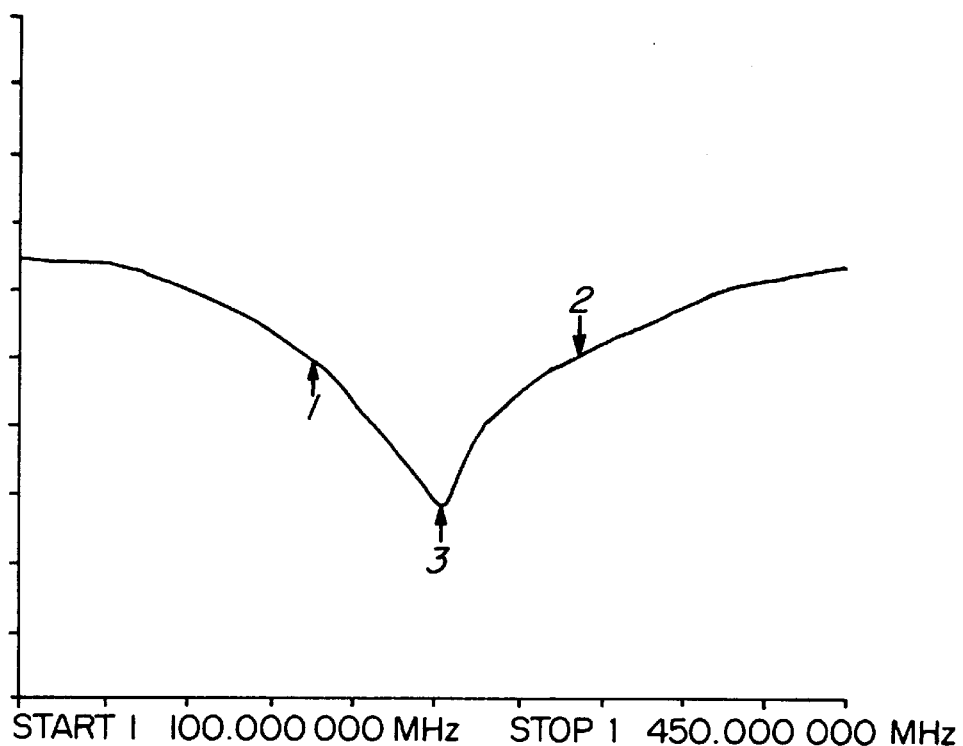
Figure 7:
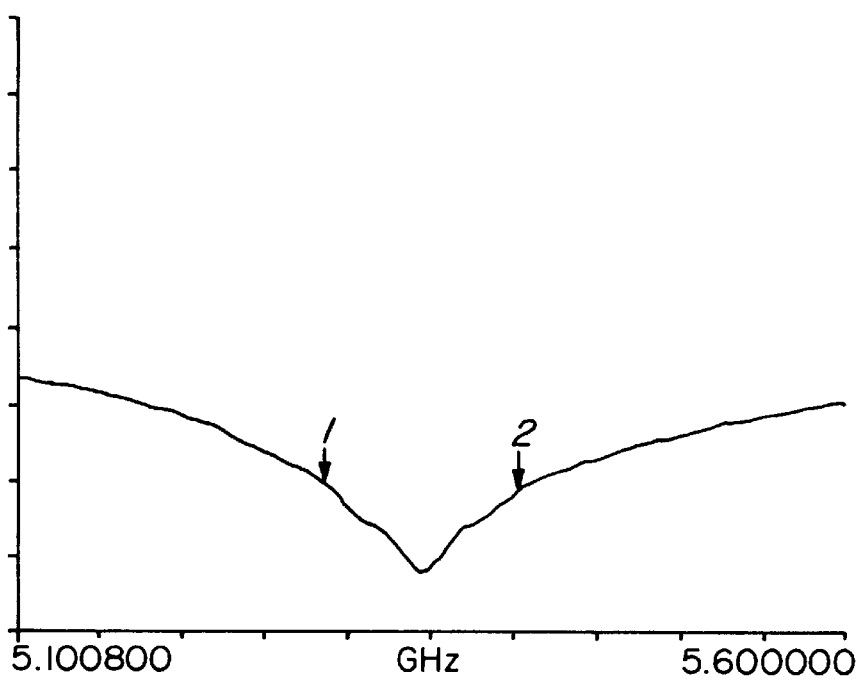

FIGS. 4 and 5 are graphs of radiation patterns of L and C band elements in the E-plane at 1.3 GHz and 5.3 GHz respectively, resulting from the laboratory prototype described above of the embodiment of FIG. 3A. The upper curve in each of the Figures is the co-polarized pattern and the lower curve in each of the Figures is the cross-polarized pattern. FIGS. 6 and 7 are graphs or the return loss of the resonator in the vicinity of the L-band and C-band resonances.

The described embodiments of the present invention thus provides dual band operation, dual polarization, reduced size, light weight, and solid structure, in an antenna which is highly suitable for spaceborn applications.

A person understanding this invention may now conceive of alternative structures and embodiments or variations of the above. All those which fall within the scope of the claims appended hereto are considered to be part of the present invention. For example, the structures and concepts of the present invention can be used to form an antenna which is not limited to two frequencies, and can combine either polarization with circularly polarized resonating elements. For example, a structure which can radiate at more than two frequencies can be formed of plural arrays of elements within a projection of the bounds of the ring resonator, wherein different arrays have elements spaced and sized to resonate at different frequencies.

I claim:

1. A dual band, dual polarized antenna comprising:
   (a) an array of similarly oriented resonators in a plane for radiating at a first frequency,
   (b) a ring resonator in a plane, the array of resonators being contained within a projection of the boundary or the ring resonator, the ring resonator for radiating at a second frequency which is lower than the first frequency,
   (c) means for exciting the array of resonators to cause them to radiate at the first frequency in an electrically controllable direction with dual polarizations simultaneously, and
   (d) means for exciting the ring resonator to cause it to radiate at the second frequency with dual polarizations simultaneously.

2. A dual band, dual polarized antenna comprising:
   (a) an array of similarly oriented resonators for radiating at a first frequency,
   (b) a ring resonator which is parallel to a rectangle surrounding the array of resonators, the ring resonator for radiating at a second frequency which is lower than the first frequency,
   (c) means for applying signals to the array of resonators to cause them to radiate in an electrically controllable direction at the first frequency with dual polarizations simultaneously,
   (d) means for applying signals to the ring resonator to cause it to radiate at the second frequency with dual polarizations simultaneously, and
   (e) a groundplane spaced from the array of resonators and the ring resonator by a dielectric.

3. An antenna as defined in claim 2 in which the signals are electromagnetically coupled into the resonators.

4. An antenna as defined in claim 2 in which the signals are electrically coupled into the resonators.

5. An antenna as defined in claim 2 in which the ring resonator is square in shape, and in which the means for applying signals to the ring resonator is comprised of exciting the ring resonator at four opposite feed points, each opposite pair of feed points being excited for their respective polarizations at 0° and 180° in a balanced manner.

6. An antenna as defined in claim 5 in which each side of the ring resonator is no greater than ¼ electrical wavelength of the lower frequency in length.

7. An antenna as defined in claim 6 in which each resonator of the array of resonators is square in shape having sides each of which is approximately ½ wavelength of the first frequency in the dielectric, in length.

8. An antenna as defined in claim 7 including means for supporting the array of resonators and the ring resonator in a single plane.

9. An antenna as defined in claim 8, including a stripline or microstrip line insulated from the ground plane, located on a side of the ground plane opposite said resonators, and means for coupling signals carried by the stripline or microstrip line to said resonators.

10. An antenna as defined in claim 9 in which the means for coupling signals is comprised of a feed conductor passing through a hole in the ground plane between the stripline or microstrip line and a resonator via the dielectric.

11. An antenna as defined in claim 9 in which the means for coupling signals is comprised of an aperture in the ground plane for electromagnetically coupling signals between the stripline or microstrip line and a resonator via the dielectric.

12. An antenna as defined in claim 8, including at least one connector having a conductor connected to the groundplane, and another conductor passing through an aperture in the groundplane, for applying said signals to at least one of said resonators.

13. An antenna as defined in claim 8 in which the dielectric is at least one of foam and honeycomb material.

14. An antenna as defined in claim 13 in which the material of the dielectric is of low permitivity.

15. An antenna as defined in claim 2 in which the ring resonator is square in shape, each side of the square being no greater than ¼ electrical wavelength of the lower frequency.

16. A dual band, dual polarized antenna comprising:
(a) an array of resonators in a plane for radiating at a second frequency which is lower than the first frequency,
(b) a ring resonator in a plane, the array of resonators being contained within a projection of the boundary of the ring resonator, the ring resonator for radiating at a second frequency which is lower than the the first frequency,
(c) means for exciting the array of resonators to cause them to radiate at the first frequency with dual polarizations simultaneously,
(d) means for exciting the ring resonator to cause it to radiate at the second frequency with dual polarizations simultaneously, and
(e) means for supporting the array of resonators in a different plane than the ring resonator.

17. An antenna as defined in claim 16 in which the plane supporting the array of resonators is behind the plane supporting the ring resonator.

18. An antenna system comprising plural antennae each as defined in claim 16, one antenna being located in a different plane from, and above a second antenna, ground planes of the plural antennae being coincident and spaced behind the second antenna.

19. An antenna system as defined in claim 18, and means for applying said signals to the resonators of the second antenna, the second antenna being located behind said one antenna so as to couple electromagnetic energy from resonators of the second antenna to resonators of said one antenna.

* * * * *